A. O. BUCKIUS, Jr.
JOURNAL BOX.
APPLICATION FILED MAR. 10, 1917.
1,280,385.
Patented Oct. 1, 1918.
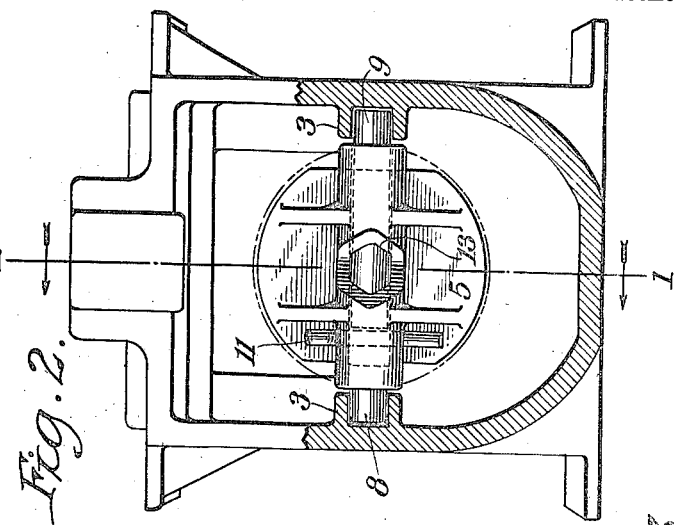
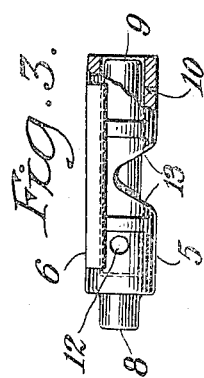
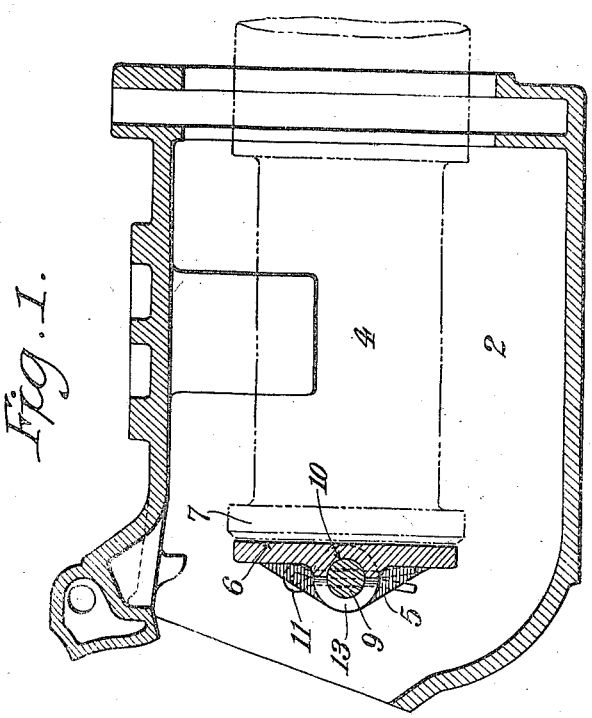
Inventor
Albert O. Buckius Jr.
By his Attorney
Clarence Sperr

UNITED STATES PATENT OFFICE.

ALBERT O. BUCKIUS, JR., OF CHICAGO, ILLINOIS, ASSIGNOR TO THE NATIONAL MALLEABLE CASTINGS COMPANY, OF CLEVELAND, OHIO, A CORPORATION OF OHIO.

JOURNAL-BOX.

1,280,385.  Specification of Letters Patent.  Patented Oct. 1, 1918.

Application filed March 10, 1917. Serial No. 153,827.

*To all whom it may concern:*

Be it known that I, ALBERT O. BUCKIUS, Jr., a citizen of the United States, residing at Chicago, Cook county, Illinois, have invented new and useful Improvements in Journal-Boxes, of which the following is a specification, reference being had to the accompanying drawings, in which—

Figure 1 is a vertical section, on lines I—I of Fig. 2, of a journal box embodying my invention; Fig. 2 is an elevation, partly in section thereof, and Fig. 3 is a detail of the axle stop.

My invention relates to journal boxes, and consists in providing means for taking up the end thrust of the axle on a journal box. My invention also relates to the coöperation and construction of the parts which I shall hereinafter describe and claim.

Referring to the drawings, 2 is a journal box provided on its inner side walls with sockets 3, having uninterrupted inclosing walls, arranged approximately in the horizontal axial plane of the axle journal 4. The axle end stop 5 has a face 6 intended to bear against the end 7 of the journal 4, and a pair of trunnions 8 and 9, which seat in the inclosed sockets 3. The trunnion 9 preferably is contained in a sleeve 10 in the stop, so that the trunnion 9 may be withdrawn into the body of the stop, and the disengagement of the stop from the sockets 3 may be thereby readily effected. The fit between the trunnions and the sockets is made loose enough so that, after the trunnion 9 has been withdrawn into the sleeve 10 of the stop, as is shown in Fig. 3, the stop may be drawn outwardly, so as to disengage the trunnion 8 from its socket and thereby allow its removal. When the stop 5 is in the position shown in Figs. 1 and 2, a cotter pin 11 may be inserted through the apertures 12 in the stop, thereby providing a bearing in the sleeve against the end of the trunnion 9, which will prevent the retraction of the trunnion 9 into the sleeve and hold it in its extended position within the socket. In order that the trunnion 9 may be operated conveniently, one side of the sleeve is cut away at 13, to permit easy access to the trunnion.

The axle end stop is capable of oscillation with the axle journal 4, so that it will maintain a full bearing over the entire end face of the journal, regardless of whether or not the horizontal center line of the journal and of the journal box lie in the same axial plane, and will therefore take up the end thrust from the journal without undue strain or wear. As the end stop is secured by its trunnions 8 and 9 in the sockets 3 in the journal box, it cannot be displaced by accident. The stop may be readily removed when the journal box is in position on the journal without disturbing the journal, journal box or any of the other parts.

The terms and expressions which I have employed are used as terms of description and not of limitation, and I have no intention, in the use of such terms and expressions, of excluding any mechanical equivalents of the features shown and described, or portions thereof, but recognize that various structural modifications are possible within the scope of the invention claimed.

What I claim is:

1. In journal boxes, an axle journal, and an axle end stop having an oscillating bearing on the journal box and a bearing against the end of the axle journal, the stop and the bearing therefor on the journal box being contained wholly within the box, the stop being adapted to move with the journal and to oscillate relative to the box, said stop being disengageable from the box without disturbing the other parts.

2. In journal boxes, an axle end stop comprising a member adapted to bear against the end of the axle journal, said member having laterally-extending trunnions seating in sockets on the inner walls of the journal box, said member being adapted to oscillate with the journal and to provide a bearing against the end of the journal regardless of the relative movements between the journal and journal box.

3. In journal boxes, an axle end stop mounted to move relatively to the journal box and with the journal, trunnions on the stop seating in bearings in the journal box, and means for removing the stop without disturbing either the journal or box.

4. In journal boxes, an axle end stop mounted to move relatively to the journal box and with the journal, trunnions on the stop seating in bearings in the journal box, one of said trunnions being capable of movement relatively to the end stop to permit the disengagement of the trunnions from its sockets, and thereby permit removal of the stop from the box without disturbing the other parts.

ALBERT O. BUCKIUS, Jr.